United States Patent [19]

Ito et al.

[11] Patent Number: 5,557,472
[45] Date of Patent: Sep. 17, 1996

[54] FAST ASPHERICAL LENS SYSTEM

[75] Inventors: Takayuki Ito; Yasuyuki Sugano, both of Tokyo, Japan

[73] Assignees: Asahi Kogaku Kogyo Kabushiki Kaisha; Asahi Seimitsu Kabushiki Kaisha, both of Tokyo, Japan

[21] Appl. No.: 260,815

[22] Filed: Jun. 16, 1994

[30] Foreign Application Priority Data

Jun. 16, 1993 [JP] Japan .................................. 5-145131

[51] Int. Cl.$^6$ .............................. G02B 13/04; G02B 9/64; G02B 3/02
[52] U.S. Cl. ................. 359/751; 359/755; 359/708
[58] Field of Search .................................. 359/708, 749, 359/750, 754, 755, 751

[56] References Cited

U.S. PATENT DOCUMENTS

| | | | |
|---|---|---|---|
| 2,785,603 | 3/1957 | Cook | 359/751 |
| 3,033,082 | 5/1962 | Merigold | 359/751 |
| 3,738,738 | 6/1973 | Takahashi | 359/749 |
| 3,870,402 | 3/1975 | Takahashi et al. | 359/751 |
| 3,975,091 | 8/1976 | Takahashi | 359/751 |
| 4,487,485 | 12/1984 | Hisada | 359/750 |
| 4,566,764 | 1/1986 | Matsuo | 359/750 |
| 5,162,945 | 11/1992 | Matsuo et al. | 359/646 |

Primary Examiner—Rodney B. Bovernick
Assistant Examiner—Dawn-Marie Bey
Attorney, Agent, or Firm—Greenblum & Bernstein, P.L.C.

[57] ABSTRACT

A fast lens system is provided which includes a front lens group having a negative power, a diaphragm, and a rear lens group having a positive power, arranged in this order from a side of an object of the lens system. The lens system satisfies the following conditions:

$$-0.5 < f_F/f < -0.2; \quad (1)$$

$$1.0 < \Sigma d_{F+S}/f < 3.0; \quad (2)$$

ana

$$1.5 < \Sigma d_R/f < 3.0, \quad (3)$$

wherein f represents a focal length of the entire lens system, $f_F$ represents a focal length of the front lens group, $\Sigma d_{F+S}$ represents a sum of the thickness of the front lens group and the distance between the front lens group and the rear lens group, and $\Sigma d_R$ represents a thickness of the rear lens group.

8 Claims, 5 Drawing Sheets

FIG.1

FRONT LENS GROUP    REAR LENS GROUP

FRONT LENS GROUP    REAR LENS GROUP

FIG. 4A F=0.82 SPHERICAL ABERRATION SINE CONDITION
FIG. 4B F=0.82 SPHERICAL ABERRATION CHROMATIC ABERRATION
FIG. 4C Y=4.0 TRANSVERSE CHROMATIC ABERRATION
FIG. 4D Y=4.0 ASTIGMATISM
FIG. 4E Y=4.0 DISTORTION

FRONT LENS GROUP  REAR LENS GROUP

SPHERICAL
ABERRATION

SINE CONDITION

SPHERICAL
ABERRATION

CHROMATIC
ABERRATION

FIG.10C
Y=4.0

TRANSVERSE
CHROMATIC
ABERRATION

ASTIGMATISM

FIG.10E
Y=4.0

DISTORTION

FAST ASPHERICAL LENS SYSTEM

BACKGROUND OF THE INVENTION

1. Field of the Invention

The present invention relates to a fast lens system which can be advantageously used with a small TV camera, such as a CCTV camera or the like.

2. Description of Related Art

In a known small TV camera, a small image pickup device of high resolution having small pixels is usually used. Therefore, a fast lens having a small f-number is required as a photographing lens, i.e., filming lens. However, the f-number of the conventional fast lenses is approximately F1.0 to F1.2.

It is an object of the present invention to provide a standard fast lens system having a large back-focal distance and an extremely small f-number which is approximately F0.8.

SUMMARY OF THE INVENTION

To achieve the object mentioned above, according to an aspect of the present invention, there is provided a fast lens system comprising a front lens group having a negative power, a diaphragm, and a rear lens group having a positive power, located in this order from the side of an object to be photographed, wherein the lenses satisfy the relationship defined by the following conditions (1) through (3);

$$-0.5 < f/f_F < -0.2 \quad (1)$$

$$1.0 < \Sigma d_{F+s}/f < 3.0 \quad (2)$$

$$1.5 < \Sigma d_R/f < 3.0 \quad (3)$$

wherein,
- $f$ represents a focal length of the entire lens system,
- $f_F$ represents a focal length of the front lens group,
- $\Sigma d_{F+s}$ represents a sum of the thickness of the front lens group and the distance between the front lens group and the rear lens group,
- $\Sigma d_R$ represents a thickness of the rear lens group.

In an embodiment of the present invention, the rear lens group includes three lens groups of positive power. Among the three groups, the lens group nearest to the object side includes a cemented lens assembly which is constituted by a lens of positive power and a lens of negative power. Cemented surfaces of the cemented lens assembly are concave with respect to the image surface. The rear lens group satisfies the following conditions (4) through (7).

$$0.6 < \Sigma d_{R1+2}/f < 1.5 \quad (4)$$

$$1.75 < N_{R1} \quad (5)$$

$$1.7 < N_{R2} \quad (6)$$

$$1.0 < r_{RC}/f < 2.5 \quad (7)$$

wherein,
- $\Sigma d_{R1+2}$ represents a thickness of the cemented lens assembly of the rear lens group,
- $N_{R2}$ represents a refractive index of the negative lens of the cemented lens assembly in the rear lens group,
- $N_{R2}$ represents a refractive index of the positive lens of the cemented lens assembly in the rear lens group,
- $r_{RC}$ represents a radius of curvature of cemented surfaces of the cemented lens assembly in the rear lens group.

Preferably, the rear lens group is provided with a lens having a diverging aspherical lens surface which satisfies the following conditions (8) and (9);

$$-0.9 < \Delta I_{ASP} < 0 \quad (8)$$

$$I_{SP}/\Delta I_{ASP} < 0.2 \quad (9)$$

wherein
- $\Delta I_{ASP}$ represents an aberration factor of the aspherical surface term of a third-order spherical aberration factor of the aspherical lens surface (i.e., aberration factor when the focal length is converted to be 1.0), wherein
- $I_{SP}$ represents an aberration factor of the spherical surface term of the third-order spherical aberration factor of the aspherical lens surface.

The amount of variation in the coefficient of the third order aberration due to the aspheric surface will now be described. The shape of the aspheric surface can be generally expressed as follows.

$$X = \frac{CY^2}{1 + \{1 - (1+K)C^2Y^2\}^{1/2}} + A_4Y^4 + A_6Y^6 + A_8Y^8 + A_{10}Y^{10} + \ldots$$

wherein,
- Y represents a height above the axis,
- X represents a distance from a tangent plane of an aspherical vertex,
- C represents a curvature of the aspherical
- k represents a conic constant,
- $A_4$ represents a fourth-order aspherical aberration factor,
- $A_6$ represents a sixth-order aspherical aberration factor,
- $A_8$ represents a eighth-order aspherical aberration factor; and,
- $A_{10}$ represents a tenth-order aspherical aberration factor.

When the focal length f is 1.0, the resultant value is transformed as follows. Namely, substitute the following equations into the above equation:

$$X = x/f, \; Y = y/f, \; C = fc$$

$$\alpha_4 = f^3 A_4, \; \alpha_6 = f^5 A_6, \; \alpha_8 = f^7 A_8, \; \alpha_{10} = f^9 A_{10},$$

In this way, the following equation is obtained.

$$X = \frac{CY^2}{1 + (1 - C^2Y^2)^{1/2}} + \alpha_4 Y^4 + \alpha_6 Y^6 + \alpha_8 Y^8 + \alpha_{10} Y^{10} + \ldots$$

The second and subsequent terms define the amount of asphericity of the aspheric surface.

The relationship between the coefficient $A_4$ of the second term and the coefficient of the third-order aspheric surface $\Phi$ is expressed by:

$$\Phi = 8(N'-N)\alpha_4$$

wherein N is the refractive index of a material nearer the object side with regard to the aspherical surface, and N' is the refractive index of a material behind the aspherical surface.

The coefficient of the aspheric surface $\Phi$ provides the following amounts of variation in the coefficients of the various kinds of third-order aberration.

$$\Delta I = h^4 \Phi$$

$$\Delta II = h^3 k \Phi$$

$$\Delta III = h^2 k^2 \Phi$$

$$\Delta IV = h^2 k^2 \Phi$$

$$\Delta V = h k^3 \Phi$$

wherein

I is the spherical aberration coefficient,

II is the coma coefficient,

III is the astigmatism coefficient,

IV is the curved surface coefficient of spherical image absent surface,

V is a distortion coefficient, h is the height of paraxial on-axis rays passing through each lens surface; and, k is the height of paraxial and off-axis rays passing through the center of the pupil and each lens surface.

The shape of aspheric surface can be expressed by various other equations but when y is smaller than the paraxial radius of curvature, satisfactory approximation can be achieved by even-order terms alone. Hence, it should be understood that the applicability of the present invention is in no way compromised by merely changing the equations for expressing the shape of the aspheric surface.

$\Delta I$ set forth above corresponds to $\Delta I_{ASP}$ in the present invention.

The front lens group may be comprised of the following combinations: a combination of a first lens of positive power, a second lens of negative power, a third lens of negative power and a fourth lens of negative power, located in this order from the object side (combination 1); and, a combination of a first lens of positive power, a second lens of negative power, a third lens of positive power and a fourth lens of negative power, located in this order from the object side (combination 2).

In combination 1, the third lens has a concave surface of a large curvature facing the image side, and the fourth negative lens is a meniscus lens of negative power having a concave surface of a large curvature facing the object side. The third and fourth negative lenses satisfy the following conditions (10) and (11);

$$0.5 < r_{3-2}/f < 1.0 \quad (10)$$

$$-1.0 < r_{4-1}/f < -0.5 \quad (11)$$

wherein, $r_{3-2}$ represents a radius of curvature of the surface of the third lens of negative power facing the image side in the front lens group, $r_{4-1}$ represents a radius of curvature of the surface of the fourth lens of negative power facing the object side in the front lens group.

In combination 2, the second lens of negative power has a concave surface of a large curvature facing the image side, and the fourth negative lens is a meniscus lens of negative power having a concave surface of a large curvature facing the object side. The second and fourth lenses of negative power satisfy the following conditions (12) and (13);

$$0.5 < r_{2-2}/f < 1.0 \quad (12)$$

$$-1.0 < r_{4-1}/f < -0.5 \quad (13)$$

wherein, $r_{4-1}$ represents a radius of curvature of the surface of the fourth lens of negative power facing the object side in the front lens group, $r_{2-2}$ represents a radius of curvature of the surface of the second lens of negative power facing the image side in the front lens group.

The present disclosure relates to subject matter contained in Japanese patent application No. 05-145131 (filed on Jun. 16, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

A conventional standard fast lens system is usually a Gauss-type symmetrical lens system which is modified in accordance with need. A fast lens according to the present invention is a retrofocus-type asymmetrical lens system, comprised of a front lens group of negative power and a rear lens group, located in this order from the side of an object to be photographed, in order to increase the back-focal distance.

Preferably, a diaphragm is provided between the front and rear lens groups which satisfy the condition (1), $-0.5<f/f_F<-0.2$, where f is the length of the entire lens system and $f_F$ is the focal length at the front lens group, in order to simplify the structure and to reduce the diameters of the lenses of the front lens group and the rear lens group, keeping the balance in the lens groups. In comparison with an arrangement in which the diaphragm is provided in the front lens group or the rear lens group, the arrangement of the diaphragm located between the front and rear lens groups makes it possible to minimize a possible deterioration of the optical property due to a manufacturing error of the lens system, such as a deviation or failure to an alignment of the optical axes of the lenses.

Moreover, in a small TV camera as mentioned above, in which an ND filter is usually provided in the vicinity of the diaphragm, the provision of the diaphragm between the front and rear lens groups, in connection with the requirement represented by condition (1), contributes to an elimination of a ghost image due to the reflection of light by the surfaces of the ND filter and the image pickup device.

The condition (1) defines the power of the front lens group. If the value of $f/f_F$ exceeds the upper limit of 0.2, the backfocal distance decreases, resulting in a difficulty in incorporating the lens system in the camera. Conversely, if the value is below the lower limit of 0.5, not only the entire lens length but also the diameter of the rear lens group increases. Moreover, a high-order aberration tends to occur due to the increased power of the lens groups.

The condition (2) $1.0<\Sigma d_{F+S}/f<3.0$, where $\Sigma d_{F+S}$ is the sum of the thickness of the front lens group and the distance between the front lens group and the rear lens group, specifies a distance between a surface of the first lens nearer the object side in the front lens group and a surface of the first lens nearer the object side in the rear lens group, to increase the back-focal distance and to decrease the f-number. If the value of the ratio in condition (2) exceeds the upper limit of 3.0, not only the entire lens length but also the diameter of the front lens group increases. Conversely, if the value is below the lower limit of 1.0, back-focal distance cannot be increased and compensation of the aberration will be difficult.

The condition (3) $1.5<\Sigma d_R/f<3.0$, where $\Sigma d_R$ is the thickness of the rear lens group, specifies the lens thickness of the rear lens group for decreasing the f-number. If the value of the ratio in condition (3) exceeds the upper limit of 3.0, not only the entire lens length but also the diameter of the rear lens group increases. Conversely, if the value is below the lower limit of 1.5, it is impossible to obtain a fast lens having a large back-focal distance.

The conditions (4) through (7) are related to the rear lens group. The condition (4) $0.6<\Sigma d_{1+2}/f$, where $\Sigma d_{1+2}$ is the thickness of the cemented lens of the rear lens group, specifies the lens thickness of the cemented lens of the positive power nearer an object in the rear lens group. If the value of the condition (4) exceeds the upper limit of 1.5, the lens system will be too large. Conversely, if the value is below the lower limit of 0.6, the back-focal distance cannot be increased. Furthermore, it will be difficult to compensate the spherical and comatic aberration caused in the front lens group.

The conditions (5) and (6) specify refractive indexes of the lens of positive power and the lens of negative power of the cemented lens assembly. It is preferable that both the positive and negative lenses are made of material having refractive index higher than the lower limit of the conditions (5) $1.75<N_{R1}$, where $N_{R1}$ is a refractive index of the negative lens of the cemented lens assembly of the rear lens group, and (6) $1.7<N_{R2}$, where $N_{R2}$ is a refractive index of the positive lens of the cemented lens assembly of the rear lens group. If the refractive indexes are smaller than the respective lower limits, the thickness of the lenses at the peripheral edges of the lenses will be small and a radius of curvature of the lens surface decreases, resulting in high-order aberration.

The reason that the refractive index of the lens of the negative power is higher than that of the lens of positive power is to compensate the chromatic and the spherical aberration in the rear lens group.

The condition (7) $1.0<r_{RC}/f<2.5$, where $r_{RC}$ is a radius of curvature of cemented surfaces of the cemented lens assembly in the rear lens group, specifies a radius of curvature of the cemented surface of the cemented lens assembly. In connection with the conditions (5) and (6), if a radius of curvature exceeds the upper limit defined in the condition (7), neither the chromatic aberration nor the spherical aberration in the rear lens group can be sufficiently compensated. Conversely, if the value is below the lower limit, a high-order spherical aberration tends to occur, and it is difficult to provide a sufficient thickness at the peripheral edge of the lens of positive power.

The conditions (8) $-0.9<\Delta I_{ASP}<0$, where $\Delta I_{ASP}$ is the third-order spherical aberration factor of the aspherical lens surface, and (9) $I_{SP}/\Delta I_{SP}<0.2$, where $I_{SP}$ is the aberration factor of the aspherical surface term of the third-order spherical aberration factor of the aspherical lens surface, are related to the aspherical lens surface. If a lens having a diverging aspherical surface is provided in the rear lens group where the diameter of the axial bundle of rays is large, the spherical aberration, the comatic aberration and the astigmatism can be more sufficiently compensated. The diverging aspherical surface refers to a surface whose shape is such that the curvature decreases (i.e., radius of curvature increases) toward the peripheral edge of the lens if the convex surface is aspherical, or, if the concave surface is aspherical, the curvature increases (i.e., radius of curvature decreases).

If the value of $\Delta I_{ASP}$ in the condition (8) exceeds the upper limit, sufficient aspherical surface effect cannot be expected. Conversely, if the value is below the lower limit, an excess aberration compensation (overcorrection) occurs.

The condition (9) specifies the location of the aspherical surface. The aspherical surface is preferably provided on the surface term of the aspherical aberration factor which satisfies the condition (9). Thus a possible manufacturing error of the lens system is little influenced upon the optical efficiency of the aspherical surface.

The front lens group of negative power can be assembled in at least the following two combinations: a combination of a first lens of positive power, a second lens of negative power, a third lens of negative power and a fourth lens of negative power, located in this order from the object side (combination 1); or a combination of a first lens of positive power, a second lens of negative power, a third lens of positive power, and a fourth lens of negative power, located in this order from the object side (combination 2). The provision of a lens or lenses of positive power within the front lens group having negative power contributes or contribute to compensation of the distortion. Preferably, in either combination, the concave surfaces of the largest curvature that face the image surface satisfy the conditions (10) $0.5 < r_{3-2}/f < 1.0$, where $r_{3-2}$ is the radius of curvature of the surface of the third lens of negative power facing the image side of the front lens group, and (12) $0.5 < r_{2-2}/f < 1.0$, where $r_{2-2}$ is the radius of curvature of the surface of the second lens of negative power facing the image side in the front lens group.

If the value of the ratio in the conditions (10) or (12) exceeds the upper limit, it is difficult to correct the astigmatism and the field curvature. Conversely, if the value of the ratio is below the lower limit, the negative power is too large, resulting in an excessive compensation (overcompensation) of the spherical aberration and the comatic aberration, and a high-order aberration tends to occur.

The condition (11) $-1.0 < r_{4-1}/f < -0.5$, where $r_{4-1}$ is the radius of curvature of the surface of the fourth lens of negative power facing the object side of the front lens group, is related to a terminal lens of the front lens group which is comprised of the first positive lens and the second through fourth negative lenses. The condition (13) $-1.0 < r_{4-1}/f < -0.5$ is related to a terminal lens of the front lens group which is comprised of the first and third positive lenses and the second and fourth negative lenses. If the terminal lens of the front lens group is a meniscus lens of negative power with the concave surface facing the object side, the spherical and comatic aberration can be effectively compensated, in connection with the negative lenses having the concave surfaces facing the image surface so as to satisfy the conditions (10) and (12). If the ratios in the conditions (11) and (13) exceed the respective upper limit, the negative power of the terminal lens is too large, resulting in an excessive compensation (overcompensation) of the spherical aberration and the comatic aberration. Conversely, if the ratios are below the respective lower limits, the negative power of the terminal lens is too small to correct the astigmatism and the field curvature.

Figure 1:
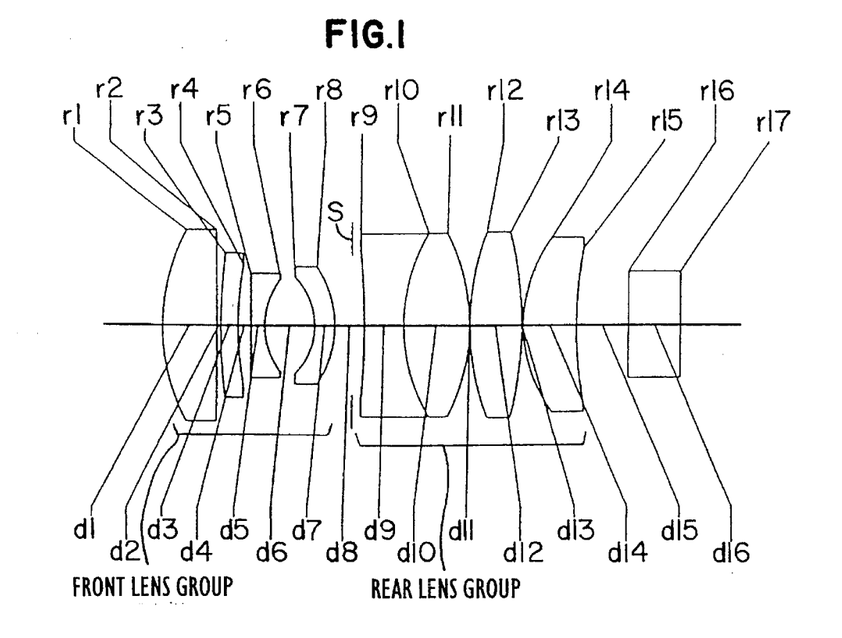
FIG. 1 is a schematic view of a lens arrangement of a fast lens system according to a first embodiment of the present invention.
Figure 2A:
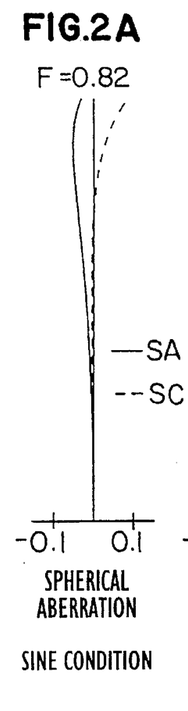
FIG. 2A shows diagrams of the sine condition in the fast lens system shown in FIG. 1.
Figures 2B, 2C:
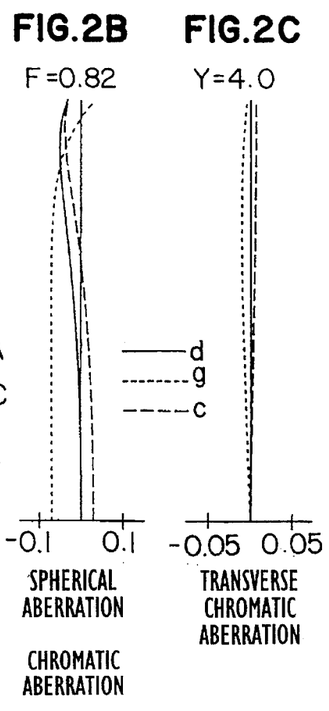
FIG. 2B shows a diagram of chromatic aberration in the fast lens system shown in FIG. 1.
FIG. 2C shows a diagram of transverse chromatic aberration in the fast lens system shown in FIG. 1.
Figure 2D:
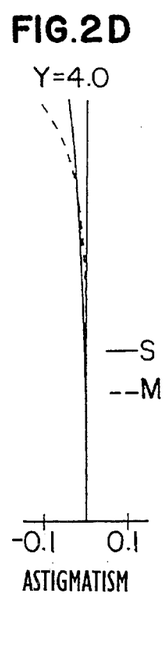
FIG. 2D shows a diagram of transverse astigmatism in the fast lens system shown in FIG. 1.
Figure 2E:
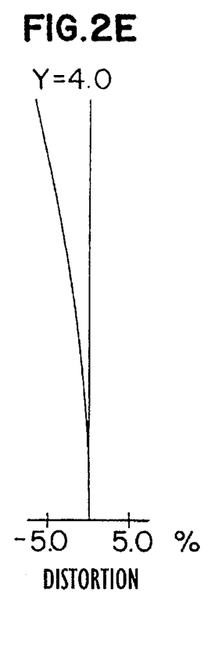
FIG. 2E shows a diagram of distortion in the fast lens system shown in FIG. 1.

First Embodiment:

FIG. 1 shows a first embodiment of a lens arrangement of the fast lens system according to the present invention.

Hereinafter, the front lens group is referred to as the lens group I and the rear lens group is referred to as the lens group II.

The first lens group I, which is located in front of a diaphragm S with respect to the object, comprises of first through fourth lenses. The second lens group II located behind the diaphragm S with respect to the object comprises fifth through eighth lenses. The fifth lens and the sixth lens are cemented to each other to form an cemented lens assembly. A plane-parallel plate is located behind the eighth lens with respect to the object.

Designations $r_1$–$r_{17}$ represent the radius of curvature for each given lens surface. Designations $d_1$–$d_{16}$ represent either the lens thickness or the distance between lenses. Diagrams of various aberrations of the lens system are shown in FIG. 2. In FIG. 2, "SA" designates the spherical aberration, "SC" designates the sine condition, "d-line", "g-line" and "C-line" designates the chromatic aberration and the transverse chromatic aberration, represented by the spherical aberration, at the respective wavelengths. "S" designates the sagittal ray, and "M" designates the meridional ray.

Numerical data or the lens system shown in FIG. 1 is shown in Table 1 below in Table 1, "$r_i$" represents a radius of curvature of each lens surface wherein i=1, 2, 3, . . . "$d_i$" represents the lens thickness or the distance between the lenses wherein i=1, 2, 3, . . . "N" represents the refractive index, and "ν" represents the Abbe number.

TABLE 1

| | $F_{NO} = 1:0.82$<br>$F = 12.30$<br>$\omega = 19.2$<br>$F_B = d_{15} + d_{16}$ (in glass) = 11.92 | | | |
|---|---|---|---|---|
| wherein, | $F_{NO}$ represents f-number,<br>f represents a focal length,<br>ω represents a half angle of view; and,<br>$f_B$ represents a back focal length. | | | |
| Surface No. | r | d | N | ν |
| 1 | 21.238 | 6.10 | 1.83400 | 37.2 |
| 2 | −671.565 | 0.39 | | |
| 3 | 60.867 | 1.90 | 1.51762 | 68.4 |
| 4 | 38.279 | 1.38 | | |
| 5 | −531.905 | 1.50 | 1.50000 | 59.1 |
| 6 | 8.193 | 5.54 | | |
| 7 | −7.297 | 2.27 | 1.84666 | 23.9 |
| 8 | −11.221 | 3.18 | | |
| 9 | −80.165 | 4.46 | 1.84666 | 23.9 |
| 10 | 18.391 | 7.55 | 1.77249 | 50.7 |
| 11 | −20.710 | 0.10 | | |
| 12 | 27.669 | 5.64 | 1.51634 | 65.2 |
| 13 | −40.774 | 0.22 | | |
| 14 | 15.717 | 5.86 | 1.77250 | 50.7 |
| 15 | 44.354 | 5.92 | | |
| 16 | ∞ | 6.00 | 1.49782 | 66.8 |
| 17 | ∞ | | | |

Figure 3:
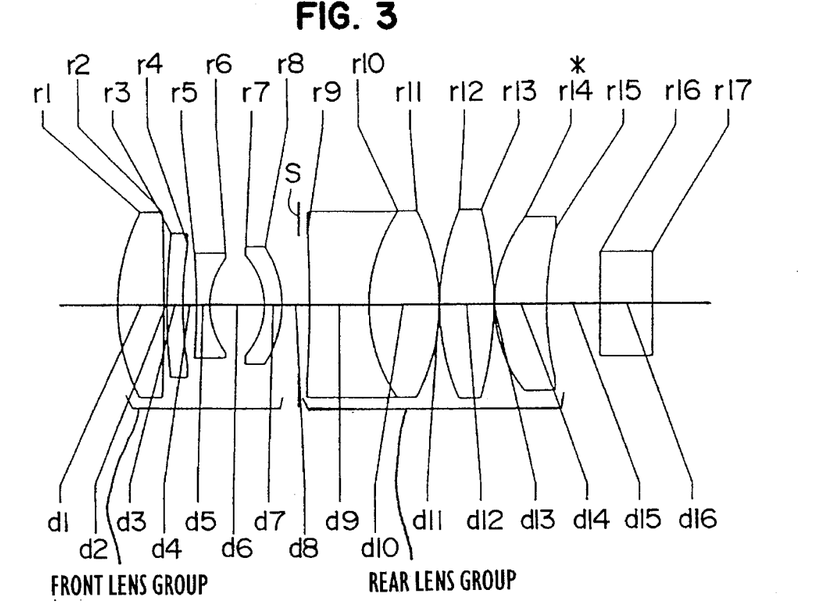
FIG. 3 is a schematic view of a lens arrangement of the fast lens system according to a second embodiment of the present invention.
Figure 4A:
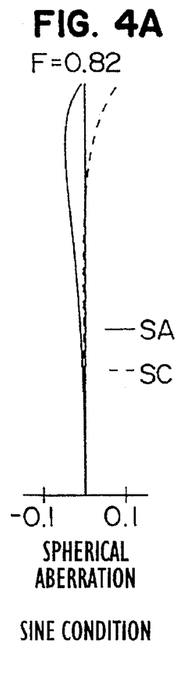
FIG 4A shows a diagram of the sine condition in the; fast lens system shown in FIG. 3.
Figures 4B, 4C:
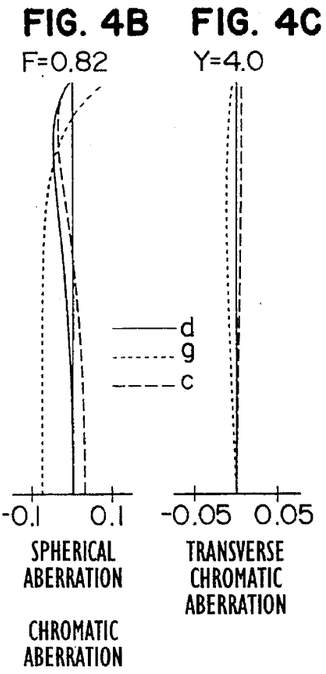
FIG. 4B shows a diagram of chromatic aberration in the fast lens system shown in FIG. 3.
FIG. 4C shows a diagram of transverse chromatic aberration in the fast lens system shown in FIG. 3.
Figure 4D:
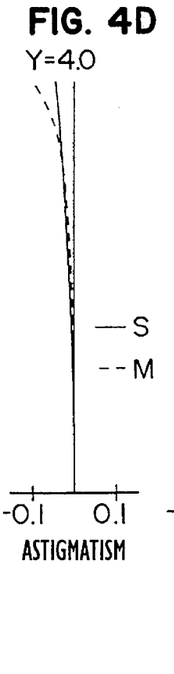
FIG. 4D shows a diagram of transverse astigmatism in the fast lens system shown in FIG. 3.
Figure 4E:
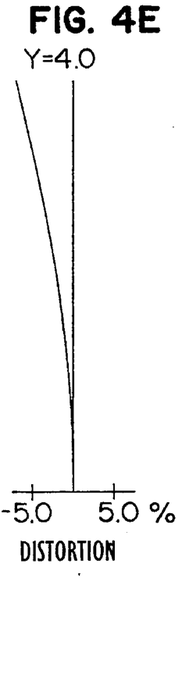
FIG. 4E shows a diagram of distortion in the fast lens system shown in FIG. 3.

Second Embodiment:

FIG. 3 shows a lens arrangement of the fast lens system according to a second embodiment of the present invention.

Numerical data of the lens system shown in FIG. 3 is shown in Table 2 below. Diagrams of various aberrations of the lens system are shown in FIG. 3.

TABLE 2

| | $F_{NO} = 1:0.82$<br>$F = 12.30$<br>$\omega = 19.3$<br>$F_B = d_{15} + d_{16}$ (in glass) = 12.26 | | | |
|---|---|---|---|---|
| Surface No. | r | d | N | ν |
| 1 | 21.907 | 5.40 | 1.83400 | 37.2 |
| 2 | −285.740 | 0.35 | | |
| 3 | 64.604 | 1.90 | 1.50000 | 72.2 |

TABLE 2-continued $F_{NO} = 1:0.82$
$F = 12.30$
$\omega = 19.3$
$F_B = d_{15} + d_{16}$ (in glass) $= 12.26$

| Surface No. | r | d | N | v |
|---|---|---|---|---|
| 4 | 40.142 | 1.60 | | |
| 5 | −68.464 | 1.50 | 1.50000 | 56.5 |
| 6 | 8.523 | 6.15 | | |
| 7 | −8.209 | 2.00 | 1.84666 | 23.9 |
| 8 | −11.874 | 3.02 | | |
| 9 | −141.119 | 6.81 | 1.84666 | 23.9 |
| 10 | 17.702 | 7.87 | 1.77250 | 50.7 |
| 11 | −23.085 | 0.10 | | |
| 12 | 26.152 | 6.09 | 1.50000 | 67.1 |
| 13 | −39.173 | 0.10 | | |
| 14 | 15.759 | 5.69 | 1.80400 | 46.6 |
| 15 | 32.932 | 6.26 | | |
| 16 | ∞ | 6.00 | 1.49782 | 66.8 |
| 17 | ∞ | | | |

Figure 5:
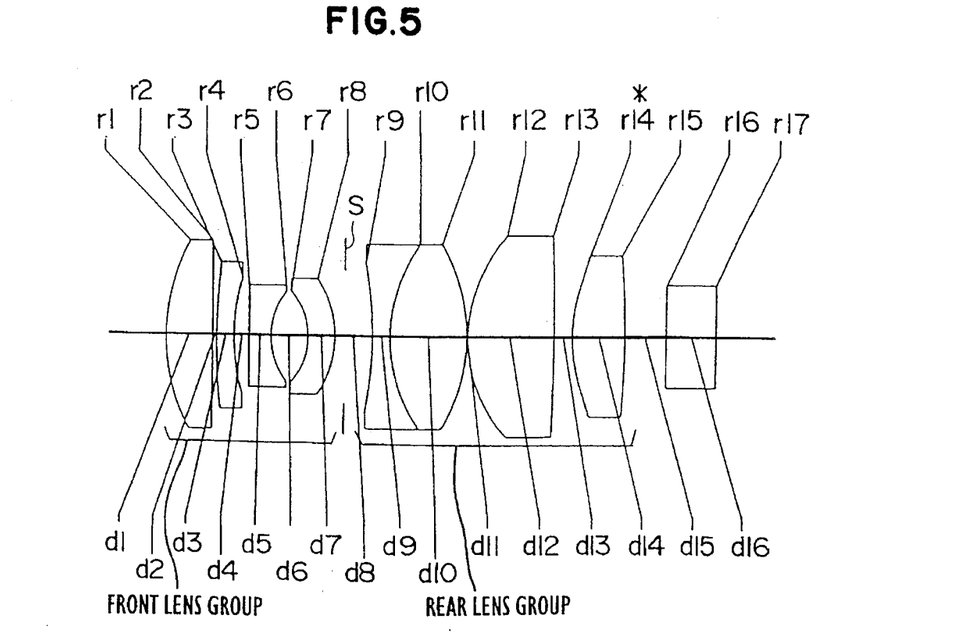
FIG. 5 is a schematic view of a lens arrangement of the fast lens system according to a third embodiment of the present invention.
Figure 6A:
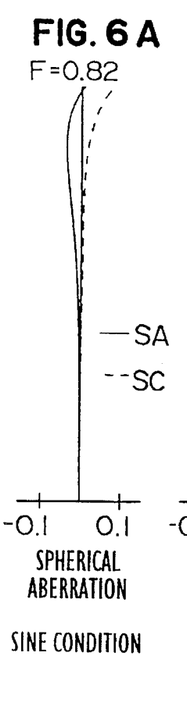
FIG. 6A shows a diagram of the sine condition in the; fast lens system shown in FIG. 5.
Figures 6B, 6C:
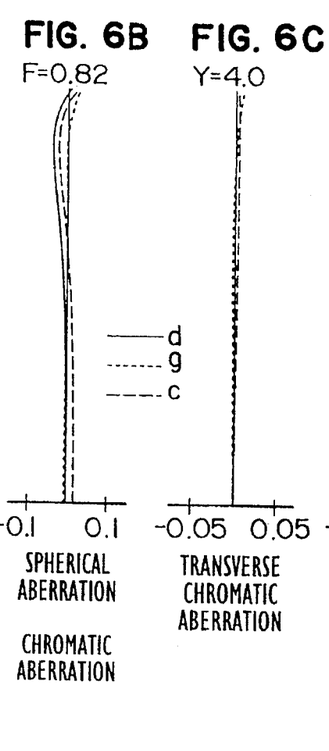
FIG. 6B shows a diagram of chromatic aberration in the fast lens system shown in FIG. 5.
FIG. 6C shows a diagram of transverse chromatic aberration in the fast lens system shown in FIG. 5.
Figure 6D:
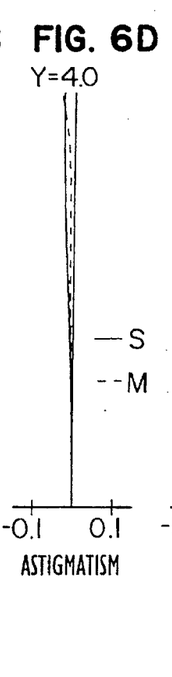
FIG. 6D shows a diagram of transverse astigmatism in the fast lens system shown in FIG. 5.
Figure 6E:
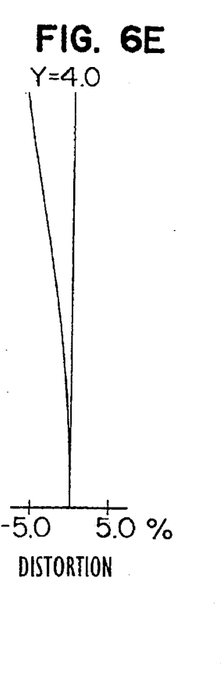
FIG. 6E shows a diagram of distortion in the fast lens system shown in FIG. 5.

Third Embodiment:

FIG. 5 shows a lens arrangement of the fast lens system according to a third embodiment of the present invention.

Numerical data of the lens system shown in FIG. 5 is shown in Table 3 below. Diagrams of various aberrations of the lens system are shown in FIG. 6.

TABLE 3

$F_{NO} = 1:0.82$
$F = 12.30$
$\omega = 19.1$
$F_B = d_{15} + d_{16}$ (in glass) $= 11.0$

| Surface No. | r | d | N | v |
|---|---|---|---|---|
| 1 | 20.568 | 5.52 | 1.83400 | 37.2 |
| 2 | −793.963 | 0.42 | | |
| 3 | 68.425 | 2.05 | 1.48749 | 70.2 |
| 4 | 22.481 | 1.73 | | |
| 5 | −2053.281 | 2.48 | 1.51633 | 64.1 |
| 6 | 8.157 | 4.12 | | |
| 7 | −7.569 | 2.97 | 1.84666 | 23.9 |
| 8 | −11.432 | 4.04 | | |
| 9 | −42.945 | 2.00 | 1.84666 | 23.9 |
| 10 | 17.629 | 8.62 | 1.74100 | 52.7 |
| 11 | −19.861 | 0.10 | | |
| 12 | 15.682 | 10.00 | 1.51633 | 64.1 |
| 13 | −285.637 | 2.05 | | |
| 14 | 16.798 | 6.12 | 1.59015 | 61.4 |
| 15 | −99.641 | 5.00 | | |
| 16 | ∞ | 6.00 | 1.49782 | 66.8 |
| 17 | ∞ | | | |

Figure 7:
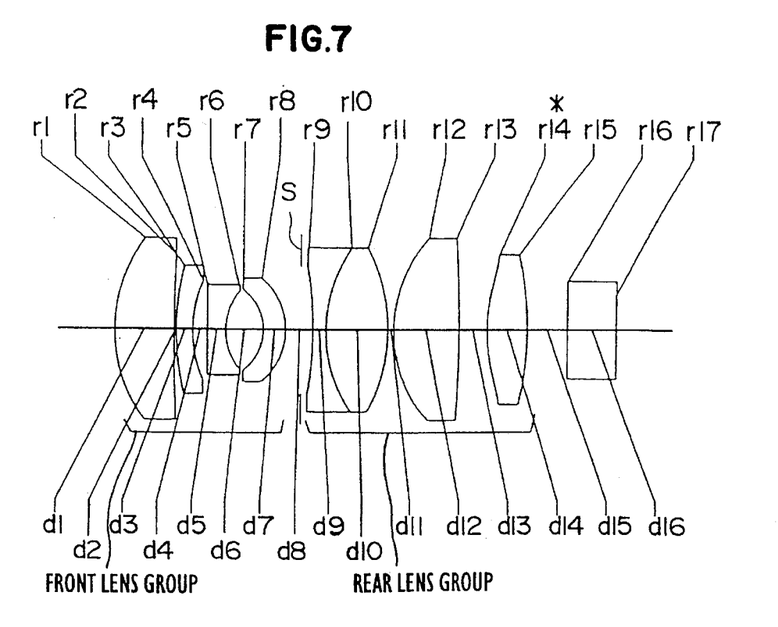
FIG. 7 is a schematic view of a lens arrangement of the fast lens system according to a fourth embodiment of the present invention.

*marked surface is aspherical.
surface no. 14;
$K = 0.0, A4 = -0.47153 \times 10^{-4}, A6 = -0.39021 \times 10^{-6}, A8 = 0.61389 \times 10^{-9},$
$A10 = -0.41184 \times 10^{-10}, A12 = 0.0$
Aspherical surface is defined by the following conditions; $x = cy^2/\{1 + [1 - (1+K)c^2y^2]^{1/2}\} + A4y^4 + A6y^6 + A8y^8 + \ldots$ Fourth Embodiment:

FIG. 7 shows a lens arrangement of the fast lens system according to a fourth embodiment of the present invention.

Figure 8A:
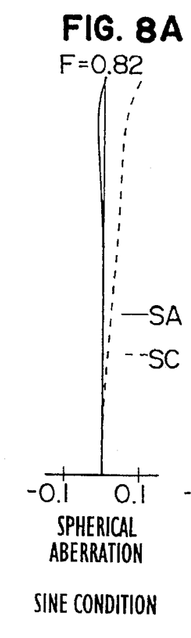
FIG. 8A shows a diagram of the sine condition in the; fast lens system shown in FIG. 7.
Figures 8B, 8C:
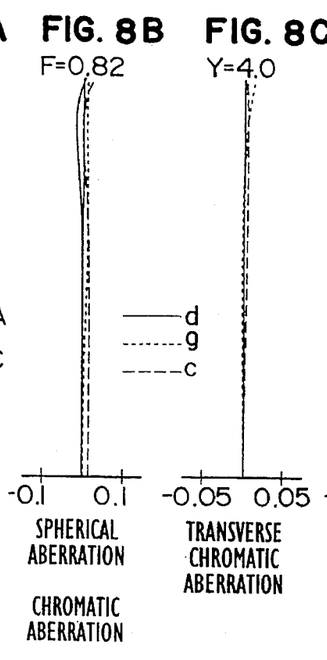
FIG. 8B shows a diagram of chromatic aberration in the fast lens system shown in FIG. 7.
FIG. 8C shows a diagram of transverse chromatic aberration in the fast lens system shown in FIG. 7.
Figures 8D, 8E:
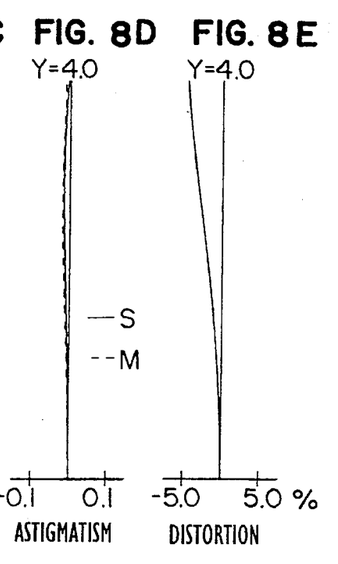
FIG. 8D shows a diagram of transverse astigmatism in the fast lens system shown in FIG. 7.
FIG. 8E shows a diagram of distortion in the fast lens system shown in FIG. 7.

Numerical data of the lens system shown in FIG. 7 is shown in Table 4 below. Diagrams of various aberrations of the lens system are shown in FIG. 8.

TABLE 4

$F_{NO} = 1:0.82$
$F = 12.30$
$\omega = 18.8$
$F_B = d_{15} + d_{16}$ (in glass) $= 11.0$

| Surface No. | r | d | N | v |
|---|---|---|---|---|
| 1 | 17.420 | 6.86 | 1.83400 | 37.2 |
| 2 | 166.090 | 0.30 | | |
| 3 | 31.253 | 1.90 | 1.56732 | 42.8 |
| 4 | 13.785 | 1.79 | | |
| 5 | 21515.462 | 2.13 | 1.51742 | 52.4 |
| 6 | 7.087 | 4.34 | | |
| 7 | −5.881 | 2.51 | 1.84666 | 23.8 |
| 8 | −7.952 | 3.25 | | |
| 9 | −42.846 | 1.50 | 1.84666 | 23.8 |
| 10 | 16.143 | 7.59 | 1.74100 | 52.7 |
| 11 | −18.975 | 0.71 | | |
| 12 | 14.937 | 8.03 | 1.48749 | 70.2 |
| 13 | −147.442 | 3.47 | | |
| 14* | 18.582 | 4.75 | 1.59015 | 61.4 |
| 15 | −37.278 | 5.00 | | |
| 16 | ∞ | 6.00 | 1.49782 | 66.8 |
| 17 | ∞ | | | |

Figure 9:
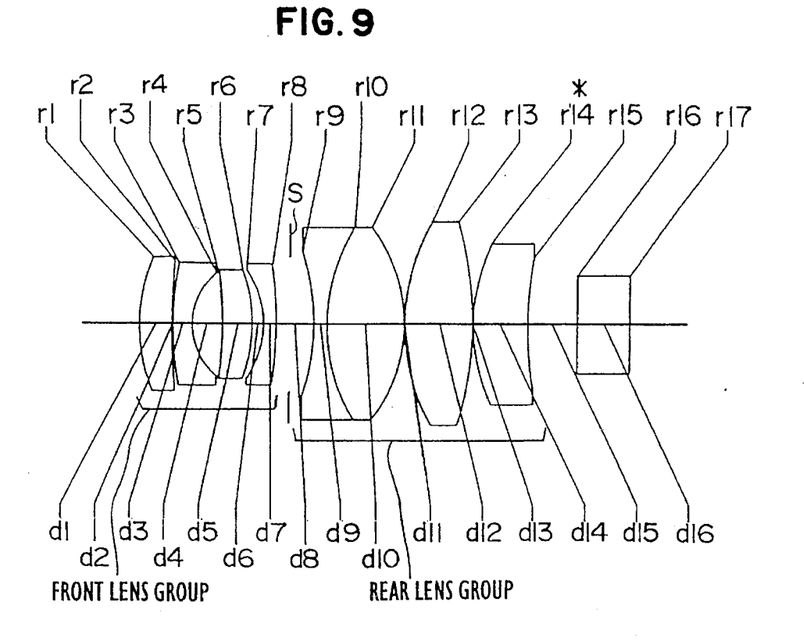
FIG. 9 is a schematic view of a lens arrangement of the fast lens system according to a fifth embodiment of the present invention.
Figure 10A:
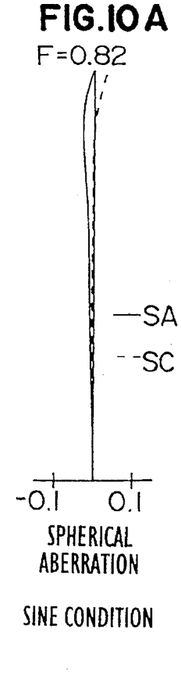
FIG. 10A shows a diagram of the sine condition in the fast lens system shown in FIG. 9.
Figures 10B, 10C:
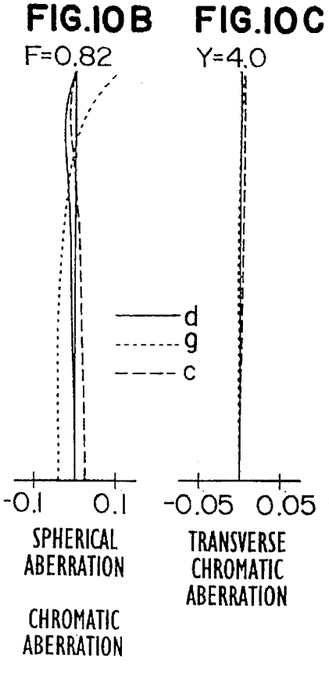
FIG. 10B shows a diagram of chromatic aberration in the fast lens system shown in FIG. 9.
FIG. 10C shows a diagram of transverse chromatic aberration in the fast lens system shown in FIG. 9.
Figure 10D:
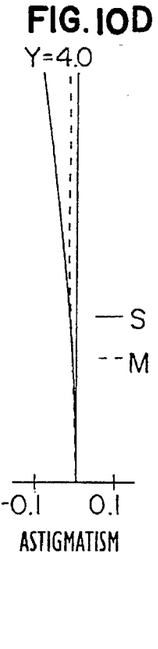
FIG. 10D shows a diagram of transverse astigmatism in the fast lens system shown in FIG. 9.
Figure 10E:
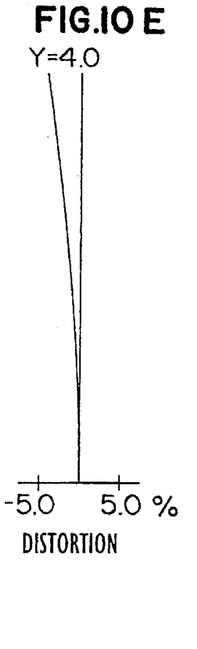
FIG. 10E shows a diagram of distortion in the fast lens system shown in FIG. 9.

*marked surface is aspherical.
surface no. 14;
$K = 0.0, A4 = -0.73070 \times 10^{-4}, A6 = -0.48150 \times 10^{-6}, A8 = -0.84666 \times 10^{-9},$
$A10 = -0.36606 \times 10^{-10}, A12 = 0.0$ Fifth Embodiment:

FIG. 9 shows a lens arrangement of the fast lens system according to a fifth embodiment of the present invention.

Numerical data of the lens system shown in FIG. 9 is shown in Table 5 below. Diagrams of various aberrations of the lens system are shown in FIG. 10.

TABLE 5

$F_{NO} = 1:0.82$
$F = 12.30$
$\omega = 18.7$
$F_B = d_{15} + d_{16}$ (in glass) $= 11.73$

| surface No. | r | d | N | v |
|---|---|---|---|---|
| 1 | 18.706 | 3.76 | 1.84700 | 23.9 |
| 2 | 80.543 | 0.10 | | |
| 3 | 35.124 | 2.25 | 1.48750 | 67.9 |
| 4 | 7.700 | 3.23 | | |
| 5 | −52.624 | 3.34 | 1.84700 | 42.3 |
| 6 | −16.644 | 1.26 | | |
| 7 | −10.517 | 1.50 | 1.83337 | 24.3 |
| 8 | −46.334 | 4.34 | | |
| 9 | −24.549 | 1.50 | 1.84700 | 23.9 |
| 10 | 20.449 | 8.72 | 1.80400 | 46.6 |
| 11 | −17.571 | 0.10 | | |
| 12 | 24.372 | 7.49 | 1.63569 | 59.1 |
| 13 | −38.638 | 0.11 | | |
| 14* | 18.969 | 6.49 | 1.66910 | 55.4 |
| 15 | 39.925 | 5.73 | | |
| 16 | ∞ | 6.00 | 1.49782 | 66.8 |
| 17 | ∞ | | | |

*surface marked is aspherical
surface No. 14:
$K = 0.0, A4 = -0.85653 \times 10^{-5}, A6 = -0.17691 \times 10^{-6}, A8 = 0.17690 \times 10^{-8},$
$A10 = -0.17354 \times 10^{-10}, A12 = 0.0$ The values of the conditions (1) through (13) corresponding to the first through fifth embodiments are shown in table 6 below.

| | EMBODIMENT | | | | |
|---|---|---|---|---|---|
| FORMULA | 1 | 2 | 3 | 4 | 5 |
| (1) | −0.35 | −0.35 | −0.37 | −0.35 | −0.30 |
| (2) | 1.81 | 1.78 | 1.90 | 1.88 | 1.61 |
| (3) | 1.94 | 2.17 | 2.35 | 2.12 | 1.98 |
| (4) | 0.98 | 1.19 | 0.86 | 0.74 | 0.83 |
| (5) | 1.847 | 1.847 | 1.847 | 1.847 | 1.847 |
| (6) | 1.772 | 1.772 | 1.741 | 1.741 | 1.804 |
| (7) | 1.50 | 1.44 | 1.43 | 1.31 | 1.66 |

-continued

| FORMULA | EMBODIMENT | | | | |
|---|---|---|---|---|---|
| | 1 | 2 | 3 | 4 | 5 |
| (8) | — | — | −0.46 | −0.50 | −0.15 |
| (9) | — | — | 0.018 | 0.005 | 0.015 |
| (10) | 0.67 | 0.69 | 0.66 | 0.58 | — |
| (11) | −0.59 | −0.67 | −0.62 | −0.65 | — |
| (12) | — | — | — | — | 0.63 |
| (13) | — | — | — | — | −0.86 |

As can be seen in Table 6, all the five embodiments satisfy the requirements defined by the conditions (1) through (13). Moreover, according to the present invention, the f-number of the fast aspherical lens system is approximately F0.8, which is very small, and the aberrations are efficiently compensated as shown in the diagrams of aberrations.

As may be understood from the above discussion, in a lens arrangement including a front lens group, a diaphragm, and a rear lens group, which satisfies the conditions recited in the claims, a fast lens having f-number approximately F0.8 can be obtained.

We claim:

1. A lens system comprising:

a front lens group having a negative power, a diaphragm, and a rear lens group having a positive power, arranged in this order from an object side of the lens system, in which the following conditions are satisfied:

$$-0.5 < f/f_F < -0.2 \tag{1}$$

$$1.0 < \Sigma d_{F+S}/f < 3.0 \tag{2}$$

$$1.5 < \Sigma d_R/f < 3.0 \tag{3}$$

wherein, f designates a focal length of the entire lens system,
$f_F$ designates a focal length of the front lens group,
$\Sigma d_{F+S}$ represents a sum of the thickness of the front lens group and a distance between the front lens group and the rear lens group; and,
$\Sigma d_R$ represents a thickness of the rear lens group; and wherein a lens having a diverging aspherical surface is provided in said rear lens group, in which the following conditions are satisfied:

$$-0.9 < \Delta I_{ASP} < 0 \tag{8}$$

$$I_{SP}/\Delta I_{ASP} < 0.2; \tag{9}$$

wherein $\Delta I_{ASP}$ represents an aberration factor of the aspherical surface term of a third-order spherical aberration factor of the aspherical lens surface; and wherein $I_{SP}$ represents an aberration factor of the spherical surface term of the third-order spherical aberration factor of the aspherical lens surface.

2. The lens system of claim 1, wherein said rear lens group is comprised of three positive lens groups, a lens group nearest to the object being a cemented lens assembly comprising a negative lens and a positive lens, wherein cemented surfaces of said negative and positive lenses are concave with respect to an image surface of the lens system, in which the following conditions are satisfied:

$$0.6 < \Sigma d_{R1+2}/f < 1.5 \tag{4}$$

$$1.75 < N_{R1} \tag{5}$$

$$1.7 < N_{R2} \tag{6}$$

$$0.6 < r_{RC}/f < 2.5 \tag{7}$$

wherein, $\Sigma d_{R1+2}$ represents a thickness of the cemented lens assembly nearest to the object in the rear lens group;
$N_{R1}$ represents a refractive index of the negative lens of the cemented lens assembly of the rear lens group;
$N_{R2}$ represents a refractive index of the positive lens of the cemented lens assembly of the rear lens group; and,
$r_{RC}$ represents a radius of curvature of the cemented surfaces of the cemented lens assembly of the rear lens group.

3. The lens system of claim 1, wherein said front lens group comprises a first positive lens group, a second negative lens group, a third negative lens group and a fourth negative lens group, arranged in this order from the object side, said third lens group having a concave surface of a large curvature facing the image side, said fourth lens group being a meniscus lens having a concave surface of large curvature facing the object side, in which said third and fourth lens groups satisfy the following conditions:

$$0.5 < r_{3-2}/f < 1.0 \tag{10}$$

$$-1.0 < r_{4-1}/f < -0.5 \tag{11}$$

wherein, $r_{3-2}$ represents a radius of curvature of the surface of the third negative lens nearer the image surface in the front lens group,
$r_{4-1}$ represents a radius of curvature of the surface of the fourth negative lens nearer the object in the front lens group.

4. The lens system of claim 1, wherein said front lens group comprises a first positive lens group, a second negative lens group, a third positive lens group and a fourth negative lens group, arranged in this order from the object side, said second lens group having a concave surface of a large curvature facing the image side, said fourth lens group being a meniscus lens having a concave surface of large curvature facing the object side, in which said second and fourth lens groups satisfy the following conditions:

$$-1.0 < r_{4-1}/f < -0.5 \tag{12}$$

$$0.5 < r_{2-2}/f < 1.0 \tag{13}$$

wherein, $r_{4-1}$ represents a radius of curvature of the surface of the fourth negative lens nearer the object in the front lens group,
$r_{2-2}$ represents a radius of curvature of the surface of the second negative lens nearer the image surface in the front lens group.

5. The lens system of claim 1, wherein said lens system comprises an f-number of about F0.8.

6. The lens system of claim 1, wherein said rear lens group comprises three positive lens groups, wherein a lens group of said three positive lens groups which is nearest to the object comprises a cemented lens assembly comprising a negative lens and a positive lens.

7. The lens system of claim 1, wherein said front lens group comprises a first positive lens group, a second negative lens group, a third negative lens group and a fourth negative lens group, arranged in this order from the object side.

8. A lens system comprising:

a front lens group having a negative power, a diaphragm, and a rear lens group having a positive power, arranged in this order from an object side of the lens system, in which the following conditions are satisfied:

$$-0.5 < f/f_F < -0.2 \qquad (1)$$

$$1.0 < \Sigma d_{F+S}/f < 3.0 \qquad (2)$$

$$1.5 < \Sigma d_R/f < 3.0 \qquad (3)$$

wherein, f designates a focal length of the entire lens system, $f_F$ designates a focal length of the front lens group, $\Sigma d_{F+S}$ represents a sum of the thickness of the front lens group and a distance between the front lens group and the rear lens group; and, $\Sigma d_R$ represents a thickness of the rear lens group; and wherein said rear lens group comprises three positive lens groups, wherein a lens group of said three positive lens groups which is nearest to the object comprises a cemented lens assembly comprising a negative lens and a positive lens.

* * * * *